(12) United States Patent
Ishak

(10) Patent No.: US 8,403,478 B2
(45) Date of Patent: *Mar. 26, 2013

(54) OPHTHALMIC LENS TO PRESERVE MACULAR INTEGRITY

(75) Inventor: Andrew Ishak, Havre de Grace, MD (US)

(73) Assignee: High Performance Optics, Inc., Roanoke, VA (US)

(*) Notice: Subject to any disclaimer, the term of this patent is extended or adjusted under 35 U.S.C. 154(b) by 223 days.

This patent is subject to a terminal disclaimer.

(21) Appl. No.: 11/303,433

(22) Filed: Dec. 16, 2005

(65) Prior Publication Data

US 2006/0092374 A1    May 4, 2006

Related U.S. Application Data

(63) Continuation-in-part of application No. 10/856,688, filed on May 28, 2004, now Pat. No. 7,066,596, which is a continuation-in-part of application No. 10/000,062, filed on Nov. 2, 2001, now abandoned.

(51) Int. Cl.
G02C 7/10 (2006.01)
G02C 7/04 (2006.01)
G02C 7/02 (2006.01)

(52) U.S. Cl. .... 351/159.6; 351/44; 351/49; 351/159.29; 351/159.32; 351/159.65

(58) Field of Classification Search ............ 351/44, 351/49, 163–166, 159.29, 159.32, 159.6, 351/159.65

See application file for complete search history.

(56) References Cited

U.S. PATENT DOCUMENTS

| 4,017,292 A | 4/1977 | Mann |
| 4,247,177 A | 1/1981 | Marks et al. |
| 4,390,676 A | 6/1983 | Loshaek |
| 4,581,288 A | 4/1986 | Barnhart et al. |
| 4,679,918 A | 7/1987 | Ace |
| 4,698,374 A | 10/1987 | Gallas |
| 4,793,669 A | 12/1988 | Perilloux |
| 4,826,286 A | 5/1989 | Thornton |
| 4,878,748 A | 11/1989 | Johansen et al. |
| 4,952,046 A * | 8/1990 | Stephens et al. ............ 351/163 |
| 5,054,902 A | 10/1991 | King |
| 5,172,256 A | 12/1992 | Sethofer et al. |

(Continued)

FOREIGN PATENT DOCUMENTS

| DE | 3544627 | 12/1985 |
| WO | WO 88/02871 | 4/1988 |

(Continued)

OTHER PUBLICATIONS

U.S. Appl. No. 11/933,069, Ishak, et al.

(Continued)

*Primary Examiner* — Scott J Sugarman

(57) ABSTRACT

An improved lens with Rugate filter specifically designed to be worn in prescription and non-prescription glasses, contact lenses, intraocular lenses and sunglasses, and to provide protection against macular degeneration by reducing harmful visible blue light transmission and ocular photochemical damage. The lens at least includes a single lens layer with a Rugate filter deposited thereon to selectively block visible blue light. Other layers may be added including a polarizing layer, dielectric layer and/or color tint in a lens sandwich configuration, to additionally give a high degree of UVA and UVB protection, color contrast, and glare reduction. The Rugate filter is a stop band which yields an exceptional light transmission profile under all light conditions, thereby maximizing protection as well as clarity of vision. In the multi-layer embodiment, all of the lens layers provide comprehensive protection for preventing macular degeneration, cataracts and other ocular injuries, yet maintain a balanced light transmission profile for visual acuity.

51 Claims, 2 Drawing Sheets

U.S. PATENT DOCUMENTS

| | | | |
|---|---|---|---|
| 5,177,509 A | | 1/1993 | Johansen et al. |
| 5,374,663 A | | 12/1994 | Daicho et al. |
| 5,400,175 A | | 3/1995 | Johansen et al. |
| 5,470,932 A | | 11/1995 | Jinkerson |
| 5,521,765 A | | 5/1996 | Wolfe |
| 5,528,322 A | * | 6/1996 | Jinkerson ............... 351/163 |
| 5,534,041 A | | 7/1996 | Havens et al. |
| 5,543,504 A | | 8/1996 | Jinkerson |
| 5,617,154 A | | 4/1997 | Hoffman |
| 5,662,707 A | | 9/1997 | Jinkerson |
| 5,694,240 A | | 12/1997 | Sternbergh |
| 5,702,819 A | | 12/1997 | Gupta et al. |
| 5,729,379 A | | 3/1998 | Allemand et al. |
| 6,021,001 A | * | 2/2000 | Turner ............... 359/585 |
| 6,102,539 A | * | 8/2000 | Tucker ............... 351/44 |
| 6,145,984 A | | 11/2000 | Farwig |
| 6,158,862 A | | 12/2000 | Patel et al. |
| 6,220,703 B1 | | 4/2001 | Evans et al. |
| 6,231,183 B1 | | 5/2001 | Dillon |
| 6,277,940 B1 | | 8/2001 | Niwa et al. |
| 6,305,801 B1 | * | 10/2001 | Kerns et al. ............... 351/162 |
| 6,306,316 B1 | | 10/2001 | Mann et al. |
| 6,310,215 B1 | | 10/2001 | Iwamoto |
| 6,326,448 B1 | | 12/2001 | Ojio et al. |
| 6,334,680 B1 | | 1/2002 | Larson |
| 6,373,615 B1 | | 4/2002 | Mann et al. |
| 6,411,450 B1 | | 6/2002 | Gatewood et al. |
| 6,444,146 B2 | | 9/2002 | Yoshimura et al. |
| 6,554,424 B1 | | 4/2003 | Miller et al. |
| 6,604,824 B2 | | 8/2003 | Larson |
| 6,641,261 B2 | | 11/2003 | Wang et al. |
| 6,793,339 B1 | | 9/2004 | Yip et al. |
| 6,851,074 B2 | | 2/2005 | Milojicic et al. |
| 6,863,848 B2 | | 3/2005 | Engardio et al. |
| 6,918,931 B2 | | 7/2005 | Lai et al. |
| 6,928,405 B2 | | 8/2005 | Wu |
| 6,955,430 B2 | | 10/2005 | Pratt |
| 6,960,231 B2 | | 11/2005 | Tran |
| 6,972,034 B2 | | 12/2005 | Tran et al. |
| 6,984,038 B2 | | 1/2006 | Ishak |
| 6,984,734 B2 | | 1/2006 | Sessler et al. |
| 6,986,579 B2 | | 1/2006 | Blum et al. |
| 7,029,118 B2 | | 4/2006 | Ishak |
| 7,029,758 B2 | | 4/2006 | Gallas et al. |
| 7,033,391 B2 | | 4/2006 | Lai et al. |
| 7,066,596 B2 | * | 6/2006 | Ishak ............... 351/163 |
| 7,255,435 B2 | | 8/2007 | Pratt |
| 7,271,298 B2 | | 9/2007 | Xu et al. |
| 7,275,822 B2 | | 10/2007 | Gupta et al. |
| 7,278,737 B2 | | 10/2007 | Mainster et al. |
| 7,279,538 B2 | | 10/2007 | Lai et al. |
| 7,304,117 B2 | | 12/2007 | Lai |
| 7,524,060 B2 | | 4/2009 | Sanchez Ramos |
| 7,713,452 B2 | | 5/2010 | Kauffman et al. |
| 7,832,903 B2 | | 11/2010 | Ramos |
| 7,914,177 B2 | | 3/2011 | Ramos |
| 2002/0042653 A1 | | 4/2002 | Copeland et al. |
| 2002/0159026 A1 | * | 10/2002 | Bernheim ............... 351/163 |
| 2003/0193643 A1 | | 10/2003 | Pratt |
| 2004/0070726 A1 | | 4/2004 | Ishak |
| 2005/0043793 A1 | | 2/2005 | Pratt |
| 2005/0054797 A1 | | 3/2005 | Lai |
| 2005/0055090 A1 | | 3/2005 | Lai |
| 2005/0055091 A1 | | 3/2005 | Lai |
| 2005/0143812 A1 | | 6/2005 | Paul et al. |
| 2005/0248752 A1 | | 11/2005 | Hall |
| 2005/0254003 A1 | | 11/2005 | Jani et al. |
| 2005/0273163 A1 | | 12/2005 | Tran et al. |
| 2005/0283234 A1 | | 12/2005 | Zhou et al. |
| 2006/0020337 A1 | | 1/2006 | Lai |
| 2006/0020338 A1 | | 1/2006 | Lai |
| 2006/0099148 A1 | | 5/2006 | Fisher et al. |
| 2006/0119954 A1 | | 6/2006 | Casper et al. |
| 2006/0126019 A1 | | 6/2006 | Liang et al. |
| 2006/0197067 A1 | | 9/2006 | Xia et al. |
| 2006/0228725 A1 | | 10/2006 | Salafsky |
| 2006/0235428 A1 | | 10/2006 | Silvestrini |
| 2006/0241263 A1 | | 10/2006 | Lai |
| 2006/0252844 A1 | | 11/2006 | Mentak |
| 2007/0034833 A1 | | 2/2007 | Parce et al. |
| 2007/0035240 A1 | | 2/2007 | Yang et al. |
| 2007/0092831 A1 | | 4/2007 | Lai et al. |
| 2007/0159594 A9 | | 7/2007 | Jani et al. |
| 2007/0188701 A1 | | 8/2007 | Sanchez Ramos |
| 2007/0195262 A1 | | 8/2007 | Mosse et al. |
| 2007/0216861 A1 | | 9/2007 | Ishak et al. |
| 2008/0002147 A1 | | 1/2008 | Haywood et al. |
| 2008/0013035 A1 | | 1/2008 | Yang et al. |
| 2008/0013045 A1 | | 1/2008 | Mainster et al. |
| 2008/0043200 A1 | | 2/2008 | Ishak et al. |
| 2008/0094566 A1 | | 4/2008 | Ishak et al. |
| 2008/0241951 A1 | | 10/2008 | Battulga et al. |
| 2008/0291394 A1 | | 11/2008 | Ishak |
| 2008/0297931 A1 | | 12/2008 | Ramos |
| 2009/0247483 A1 | | 10/2009 | Mitchell et al. |
| 2009/0268157 A1 | | 10/2009 | Krieg-Kowald et al. |
| 2010/0004330 A1 | | 1/2010 | Huant et al. |
| 2010/0007847 A1 | | 1/2010 | Cano et al. |
| 2010/0053550 A1 | | 3/2010 | Giraudet |
| 2010/0060850 A1 | | 3/2010 | Giraudet |
| 2010/0066974 A1 | | 3/2010 | Croft et al. |
| 2010/0085534 A1 | | 4/2010 | Mainster |
| 2010/0091240 A1 | | 4/2010 | Drobe et al. |

FOREIGN PATENT DOCUMENTS

| | | |
|---|---|---|
| WO | WO 2008/059177 | 5/2008 |
| WO | WO 2009/053502 | 4/2009 |

OTHER PUBLICATIONS

U.S. Appl. No. 12/037,565, Blum, et al.
Infeld, K. "Sunlight Poses Universal Cataract Risk" Johns Hopkins Study (1998) available at http://www.eurekalert.org/releases/jhu-sunposcat.html, last visited Feb. 1, 2008.
Johnson, W. And Crane, R. "Introduction to Rugate Filter Technology" SPIE vol. 2046, pp. 88-108 (Nov. 1993).
Mainster, M.A. And Sparrow J.R. "How Much Blue Light Should an IOL Transmit?" British Journal of Ophthalmology, 2003, v. 87, pp. 1523-1529 and Fig. 6.
Wyszecki and Stiles. *Color Science: Concepts and Methods, Quantitative Data and Formulae.* Wiley: New York 1982, esp. pp. 102-107.
Sparrow, J.R. et al. "Blue light-absorbing intraocular lens and retinal pigment epithelium protection in vitro" J. Cataract Refract. Surg. 2004, vol. 30, pp. 873-878.
Kalloniatis, M. and Luu, C. "Psychophysics of Vision" available at http://webvision.med.utah.edu/Phych1.html, last visited Jan. 29, 2008.
M.A. Mainster, "Violet and Blue Light Blocking Intraocular Lenses: Photoprotection vs. Photoreception", Br. J. Opthalmol, 2006, v. 90, pp. 784-792.
M.A. Mainster, "Intraocular Lenses Should Block UV Radiation and Violet but not Blue Light,"Arch. Opthal., v. 123, p. 550 (2005).
Philip Baumeister and Gerald Pincus, "Optical Interference Coatings", Scientific American, Dec. 1970.
NACL website, as archived from Oct. 8, 2000: http://web.archive.org/web/2001008003354//www.nacl.com/custom.htm obtained for WayBack Machine at www.archive.org.
CRC Handbook of Chemistry and Physics, 85th Edition, 2004-2005, p. 10-217.
Willard et al., Instrumental Methods of Analysis, 6th Edition, 1981, pp. 67-68.
Kalloniatis, M. & Luu, C. "Psychophysics of Vision" available at http://webvision.med.utah.edu/Phych1.html, last visited Jan. 29, 2008.
Mainster, M.A. 2005. Intraocular Lenses Should Block UV Radiation and Violet but not Blue Light Arch Ophthal 123:550.
U.S. Appl. No. 13/174,998, filed Jul. 1, 2011.
Nolan, J.M. et al. 2009. Augmentation of Macular Pigment following Implantation of Blue Light-Filtering Intraocular Lenses at the Time of Cataract Surgery. Invest Ophthalmol Vis Sci. 50(10):4777-85.
Ueda, T. et al. 2009. Eye damage control by reduced blue illumination, Exp. Eye. Res. 89(6):863-8.

Office Communication issued on Feb. 17, 2012 in the related Chinese application No. 200780050536.2.

Espindle et al., "Quality-of-life improvements in cataract patients with bilateral blue light-filtering intraocular lenses: Clinical trial" J. Cataract Refract Surg., vol. 31, Oct. 2005, p. 1952-1959.

Rodriguez-Galietero et al., "Comparison of contrast sensitivity and color discrimination after clear and yellow intraocular lens implantation" J.. Cataract Refract Surg., vol. 31, Sep. 2005, p. 1736-1740.

Leibovitch et al., "Visual outcomes with the yellow intraocular lens" ACTA Opthalmologica Scandinavica 2006, 84: p. 95-99.

Ernest, "Light-transmission-spectrum comparison of foldable intraocular lenses" J. Cataract Refract Surg., vol. 30, 2004, p. 1755-1758.

Li Qing et al., "The effect of blue light on visual function" International Review of Ophthalmology, vol. 30, No. 5, Oct. 2006, p. 336-340.

International Search Report corresponding to the PCT/US2011/42922 application, Nov. 15, 2011.

* cited by examiner

OPHTHALMIC LENS TO PRESERVE MACULAR INTEGRITY

CROSS-REFERENCE TO RELATED APPLICATIONS

The present application is a continuation-in-part of U.S. application Ser. No. 10/856,688 filed May 28, 2004 now U.S. Pat. No. 7,066,596, which is a continuation-in-part of U.S. application Ser. No. 10/000,062 filed Nov. 3, 2001 now abandoned.

BACKGROUND OF THE INVENTION

1. Field of the Invention

The present invention relates to optical lenses for glasses and contacts, more particularly, to an improved lens with Rugate filter specifically designed as protection against macular degeneration (prescription and non-prescription glasses and sunglasses) by reducing harmful light transmission and ocular photochemical damage.

2. Description of the Background

The goal of most protective eyewear (including high-end sunglasses) is to provide a particular light transmission profile that yields the highest protection and perfect vision under all light conditions. To accomplish this goal the lenses for protective eyewear often incorporate numerous layers and coatings all of which combine to give a particular profile for a particular purpose. The ocular hazards from ultraviolet solar radiation are well established. Ultraviolet radiation falls within a range of wavelengths below visible light, generally between 100 and 400 nanometers. Long UVA radiation occurs at wavelengths between 315 and 400 nanometers. UVB radiation occurs between 280 and 315 nanometers. UVC radiation occurs between 200 and 280 nanometers. Wavelengths between 100 and 200 nanometers are known as vacuum UV. Vacuum UV and UVC are the most harmful to humans, but the earth's ozone layer tends to block these types of ultraviolet radiation. According to Prevent Blindness America, the American Academy of Ophthalmology, and the American Optometric Association, the hazards from ultraviolet exposure include eyelid cancer, cataract, pterygium, keratitis, and macular degeneration. Cataracts are a major cause of visual impairment and blindness worldwide. "We've found there is no safe dose of UV-B exposure when it comes to risk of cataract, which means people of all ages, races and both sexes should protect their eyes from sunlight year-round." Infeld, Karen, *Sunlight Poses Universal Cataract Risk*, Johns Hopkins Study http://www.eurekalert.org/releases/jhu-sunposcat.html (1998). The damage is cumulative.

Indeed, age-related macular degeneration (AMD) is the leading cause of blind registration in the western world, and its prevalence is likely to rise as a consequence of increasing longevity. Beatty et al., *The Role of Oxidative Stress in the Pathogenesis of Age-Related Macular Degeneration*, Survey of Ophthalmology, volume 45, no. 2 (September-October 2000).

More recently, the Age-Related Eye Disease Study (AREDS) was published. This was a major clinical trial sponsored by the National Eye Institute, one of the Federal government's National Institutes of Health. The AREDS investigated the history and risk factors of age-related AMD, as well as how to reduce the risk of advanced age-related AMD and its associated vision loss. It was found that high levels of antioxidants and zinc significantly reduce the risk of advanced age-related AMD (reported in the October 2001 issue of Archives of Ophthalmology).

What is less well-known is that visible blue light can contribute to age-related AMD and its associated vision loss, causing significant damage over time. The optical spectrum (light or visible spectrum) is the portion of the electromagnetic spectrum that is visible to the human eye. A typical human eye will respond to wavelengths from 400 to 700 nm. This visible blue light falling within the 400-475 nm range can also cause damage over time. A ten-year Beaver Dam Eye Study was recently completed and is reviewed in the Arch Ophthalmology, vol. 122, p. 754-757 (May 2004). This study proves a direct correlation between the incidence of blue light and AMD but does not attribute the correlation to any particular blue light wavelengths. A number of other references suggest a correlation between the visible blue light contribution of sunlight and AMD. See, for example, West S. K. et al., Arch. Ophthaomol., 1989; 107: 875; Cruickshanks K J et al., Arch. Ophthaomol., 1993; 111: 514; Young R. W., Survey Ophthaomol., 1988; 32: 252; Mitchell P. Et al., Survey Ophthaomol., 1997; 104: 770.

The present inventor contends that there is a significant need for protective lenses that block visible blue light in the 400-475 nm range. As the entire population is potentially exposed to sunlight, the odds ratio of 13.6 and 2.19 for high exposure to visible blue light and AMD represent quite robust evidence in support of the sunlight/AMD hypothesis. Consequently, a lens that dramatically reduces visible blue light (preferably in combination with a high degree of UVA and UVB protection, and without sacrificing visual acuity) will preserve visual function.

This transmission profile is difficult to achieve with conventional lens technology. The Food and Drug Administration only recommends that sunglasses, prescription or non-prescription, block 99% of UVB and 95% of UVA, and most sunglasses on the market meet these criteria. The American National Standards Institute (ANSI) rates nonprescription eyewear for their potential to protect the human eye against solar radiation. However, many feel that the ANSI Z80.3 standard falls short. For example, the Z80.3 standard does not require specific quantification of the precise transmittance of ultraviolet radiation, nor blue light or infrared radiation, or reflected or scattered solar radiation that is not transmitted through the lens but still reaches the human eye. Some sunglasses for outdoor enthusiasts can achieve 99% of both UVA & B reduction, but afford no protection against visible blue light. This is because the existing lens technologies only afford control over glare, as well as the UVA & UVB transmission profile of lenses. These technologies include polarizers, color filters and mirror coatings.

In an effort to develop a more comprehensive method of rating nonprescription eyewear for its ability to protect the eye against solar damage, the FUBI System has been proposed. The system presents a numeric value, from 0 to 100, for each of the three known harmful portions of the solar spectrum: ultraviolet (UV), blue/violet (B), and infrared (IR). A fourth value was determined for the fashion (F) of the eyewear as it relates to protection of the eye against reflected or scattered radiation that is not transmitted through the eyewear. With FUBI, the numeric value of the system for UV, B, and IR is derived by taking the average transmittance of radiation through each tested lens and weighting it by multiplying that value by a relative toxicity factor (RTF) for each waveband of solar radiation tested. The RTF is derived by multiplying the approximate level of radiation reaching a specified anatomic part of the eye at sea level for each wavelength tested by the inverse of the value of its action spectrum (sensitivity) on that part of the eye. This weighted average transmitted percentage of radiation was then deducted from 100 to derive the FUBI value for the UV, B, and IR range. The numeric value for F was derived by measuring the scattered or reflected light from five known sources of luminance at a fixed distance around opacified lenses on each tested frame. The FUBI system has been successfully used to rate a wide variety of known commercial products of nonprescription eyewear, and the highest rating is currently enjoyed by BAYZ Sunwear of Havre de Grace, Md. for their sunglasses which incorporate the technology of parent continuation-in-part Application Ser. No. 10/000,062 filed Nov. 3, 2001.

It is common to provide polarized lenses in sunglasses to eliminate the horizontal transmission of reflected light through the lenses of the glasses to the eyes of the wearer. The polarizing layer blocks light at certain angles, while allowing light to transmit through select angles. This helps to negate annoying glare reflected off other surfaces such as water, snow, automobile windshields, etc. A polarized filter is produced by stretching a thin sheet of polyvinyl alcohol to align the molecular components in parallel rows. The material is passed through an iodine solution, and the iodine molecules likewise align themselves along the rows of polyvinyl alcohol. The sheet of polyvinyl is then applied to the lens with colored rows of iodine oriented vertically in order to eliminate horizontally reflected light. The sheet of polyvinyl may be applied to a lens in one of two ways: the lamination method or the cast-in mold method. To polarize a glass lens, the lamination method is used whereby the polyvinyl filter is sandwiched between two layers of glass. For plastic lenses, the cast-in mold method is used whereby the polyvinyl filter is placed within the lens mold. Relevant prior art patents might be seen in the Schwartz U.S. Pat. No. 3,838,913 and Archambault U.S. Pat. No. 2,813,459. A significant benefit of polarized lenses is the elimination of glare from reflective surfaces such as water.

Color filters can also provide excellent ultraviolet obstruction properties. For example, U.S. Pat. No. 4,952,046 (Sun-Tiger) discloses an optical lens with an amber filter having selective transmissivity functions. This is the original "Blublocker" patent for amber lenses that substantially eliminates ultraviolet radiation shorter than 515 nm. The lens is substantially transparent to wavelengths greater than 636 nm which are most useful for high visual acuity in a bright sunlit environment. Similarly, U.S. Pat. No. 5,400,175 (SunTiger) discloses an amber filter having a cut-on at 550 nm. However, color-differentiation is highly distorted due to the deep orange tint as their deep yellow-orange tint weakens color differentiation. Indeed, many tinted sunglasses do not provide the capability to recognize traffic lights or other necessary color cues.

Various mirror coatings have been available to the sunglass industry for decades. These mirror coatings can be applied to the front and/or back surface of a lens to further reduce glare and provide protection against infrared rays. Metallic mirrors comprise a layer of metal deposited directly on a glass lens to create the equivalent of a one-way mirror. See, e.g., U.S. Pat. No. 4,070,097 to Gelber, Robert M (1978). However, like polarizers, metallic oxide coatings are not color-selective and cannot selectively block visible blue light in the 400-475 nm range.

Currently, there are no protective lenses that can also block visible blue light in the 400-475 nm range without otherwise degrading the visible light transmission spectra. Consequently, it would be advantageous to provide a lens that can block visible blue light in the 400-475 nm range to dramatically reduce visible blue light, and preferably in combination with a high degree of UVA and UVB protection to preserve visual function.

Rugate filters are a less well-known lens technology in the context of protective eyewear. A Rugate filter is an interference coating in which the refractive index varies continuously in the direction perpendicular to the film plane. The addition of a rugate filter to a lens can potentially block visible blue and UV light, while allowing other visible light to pass unimpeded. Rugate filters are wavelength specific filters that have existed for about a decade. Their simple periodic continuous structures offer a much wider set of spectral responses than discrete structures, and they typically exhibit a spectrum with high reflectivity bands. This allows the possibility of making high reflectivity mirrors with very narrow bandwidth. Moreover, they can be formed so as not to distort bandwidths outside the stop-bands. In contrast to tinted lenses, this provides the capability to recognize traffic lights and other necessary color cues. An overview of Rugate filter technology can be found at Johnson et al., "Introduction to Rugate Filter Technology" SPIE Vol. 2046, p. 88-108 (November 1993), inclusive of how a simple rugate filter is derived from Fourier analysis. Other examples can be found in U.S. Pat. No. 5,258,872 "Optical Filter" by W. E. Johnson, et al. and disclosed in U.S. Pat. No. 5,475,531 "Broadband Rugate Filter" by T. D. Rahminow, et al. However, the prior art does not teach or suggest how to incorporate a rugate filter in an optical lens to provide an outstanding spectroscopic profile that can block visible blue light in the 400-475 nm range to dramatically reduce visible blue light, alone or in combination with a polarizing filter, and/or multi-layer dielectric mirror, and/or tinted lens a high to additionally give a high degree of UVA and UVB protection.

The present inventor has found that a Rugate filter can achieve this, while still yielding an exceptional light transmission profile under all light conditions that maximizes the degree of protection as well as clarity of vision. The present Rugate filter technology can be incorporated in ophthalmic lenses, sunglasses, polarized sunglasses, intraocular lenses and contact lenses.

SUMMARY OF THE INVENTION

It is an object of the present invention to provide a Rugate filter technology incorporated in an optical lens that maximizes the degree of protection as well as clarity of vision under all light conditions.

It is another object to provide a Rugate filter technology in an optical lens that is well-suited for ophthalmic lenses, sunglasses, polarized sunglasses, intraocular lenses and contact lenses.

It is another object to provide an optical lens with Rugate filter in a lens sandwich configuration that additionally includes: a) two layers of optical lens material; b) a polarizing layer between the two layers of lens material; c) a Rugate bandpass filter to further reduce the visible blue light; and optionally, d) a dielectric layer and e) hydrophopic coating for protection.

According to the present invention, the above-described and other objects are accomplished by providing an improved lens for protective eyewear that combines a Rugate filter with an optical lens for prescription or non-prescription eyewear, inclusive of ophthalmic lenses, sunglasses, polarized sunglasses, intraocular lenses and contact lenses. The Rugate filter can be used alone to block visible blue light, and/or in combination with a polarizing layer, dielectric layer and/or color tint in a lens sandwich configuration, to additionally give a high degree of UVA and UVB protection with a well-balanced light transmission profile under all light conditions, thereby maximizing protection as well as clarity of vision.

The Rugate filter disclosed herein is a multi-layer Rugate filter providing a narrow rejection band between 400 nm and 475 nm (thereby reflecting substantially 100% of visible blue light. In the preferred embodiment the Rugate filter is applied to the exterior of a lens sandwich comprising at least two optical lens layers of any one of conventional glass, plastic (CR-39), polycarbonate, Trivex® or high-index plastic or glass layers, as a matter of design choice. Further rejection of UV-A & B and glare reduction can be achieved by an optional polarizing layer sandwiched between the two optical lens layers, an optional dielectric layer applied exteriorly of the lens sandwich, and color filters. The foregoing layers are arranged to provide a balanced light transmission profile optimum for preventing macular degeneration, cataracts and other ocular injuries, while still preserving visual acuity.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Disclosed is an improved lens designed for protective eyewear that includes a Rugate filter for blocking visible blue light. The lens is well-suited for prescription or non-prescription eyewear, inclusive of ophthalmic lenses, sunglasses, polarized sunglasses, intraocular lenses and contact lenses. The lens at least includes a plastic, polycarbonate, Trivex® or glass lens with a Rugate filter deposited thereon to selectively block visible blue light. The Rugate filter may additionally be used in conjunction with a polarizing layer, dielectric layer and/or color tint in a lens sandwich configuration, to additionally give a high degree of UVA and UVB protection with a well-balanced light transmission profile under all light conditions, thereby maximizing protection while preserving clarity of vision.

Figure 1:
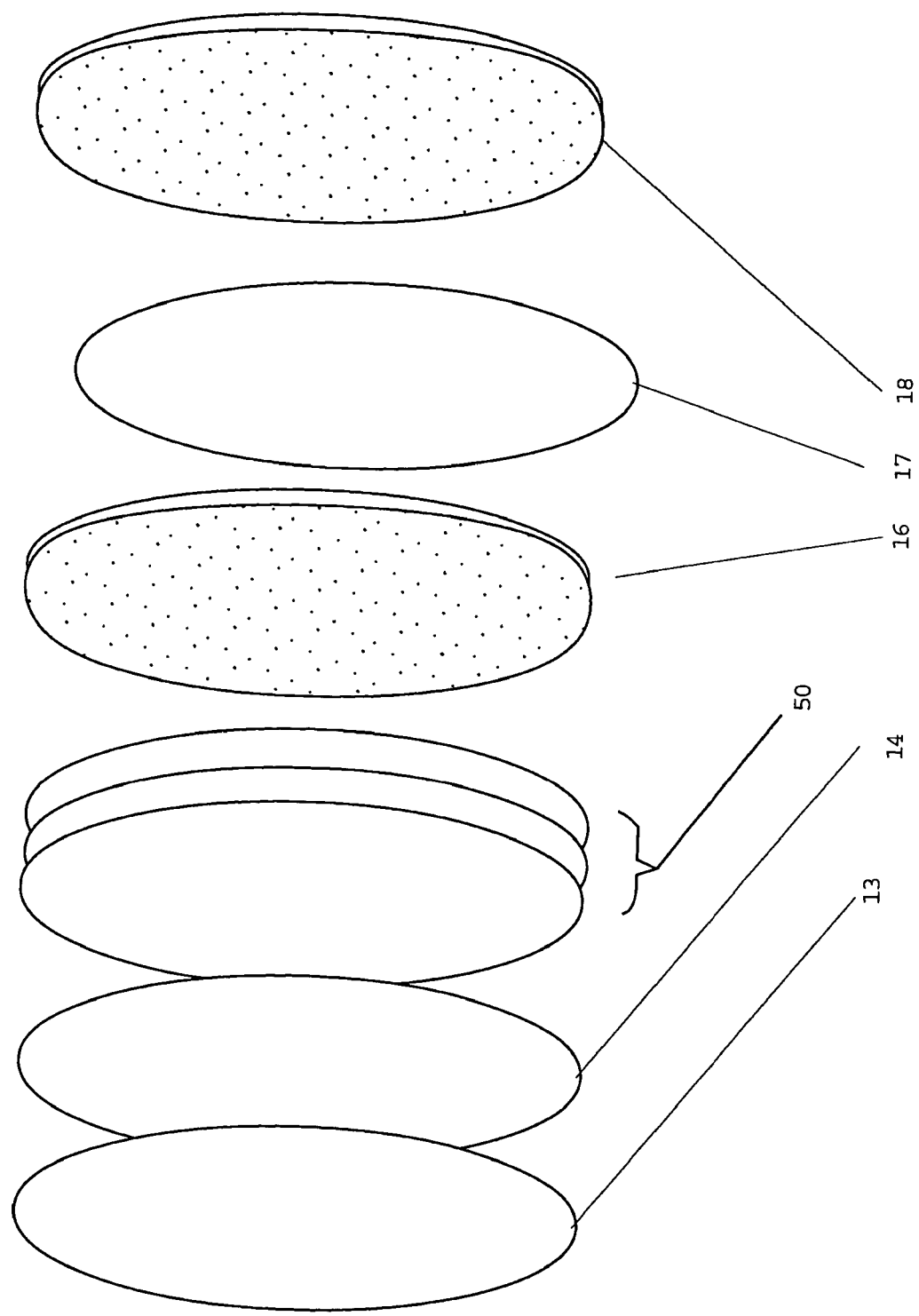
FIG. 1 is a perspective exploded sketch showing the various lens layers according to the preferred embodiment of the present invention.

FIG. 1 is a perspective exploded sketch showing the various lens layers mentioned above according to a multi-layer embodiment of the present invention. In its simplest form, the present invention comprises a first lens layer 16 with a Rugate filter 50 (to be described) deposited thereon for visible blue light protection. However, the Rugate filter may optionally be incorporated with a polarizing layer 17, and/or color tinted lens layers 16, 18 in a lens sandwich configuration, to additionally provide a high degree of UVA and UVB protection. In this case the lens layers are arranged in a sandwich configuration including a polarizing filter layer 17 bonded between two optical lens layers 16, 18, the latter being any two conforming glass, plastic (CR-39), polycarbonate, Trivex® or high-index plastic or glass layers, as a matter of design choice. It is, however, noteworthy that CR-39 (plastic) or polycarbonate lens blanks are capable of molecular bonding, which may be molecularly-bonded about the polarizing filter layer 17 to provide better wear characteristics as follows. In addition, both the first lens layer 16 and second lens layer 17 may be colorized to increase contrast, such as with high-contrast blue-blocking amber-tint, color discriminating grey tint, or otherwise. This may be accomplished by conventional dip dyeing techniques as shown and described in U.S. Pat. No. 4,245,991. The optional tinting of one or both lens layers 16, 18 with high-contrast blue-blocking amber-tint, color discriminating grey, or any other commercially available high-contrast tint will help to block UVA and UVB and add a color-discriminating (contrast) capability to the visible transmission profile.

The Rugate filter 50 comprises alternating layers applied (adhered or molecularly bonded) to the exterior of the existing lens sandwich 16-18, either as an outer layer 9 (as shown) or inner layer, to eliminate all visible blue light. The Rugate filter 50 is a multiple dielectric layer filter composed of alternate layers of silicon nitride ($Si_3N_4$) and silicon dioxide ($SiO_2$) or alternate layers of hafnium oxide ($HfO_2$) and $SiO_2$. This layered structure varies the index of refraction to produce a profile with the desired optical properties. The Rugate filter 50 according to the present invention is made as an effective bandstop filter to exhibit a controlled narrow-band light blocking profile. This effectively provides a Rugate notch filter or "interference filter" with a deep, narrow rejection band that nevertheless provides a high, flat transmission for the rest of the spectrum. In accordance with the present invention, the alternate Rugate filter 50 layers are stacked together to form a stop band, the stop band being defined at bandpass cutons of 400 nanometers (nm) and 475 nm, respectively. Thus, the Rugate filter will selectively block visible blue light between 400 nanometers (nm) and 475 nm. UV-A & B light below 400 nm will also be blocked by conventional methods to be described.

The Rugate filter 50 layers are each a gradient index structure having a sinusoidal refractive index profile. The properties of the Rugate filter 50 layers are determined by the values of the average refractive index (Na) and the peak-to-peak modulation of the refractive index (Np). The refractive index as a function of thickness, N(t), is given by:

$$N(t)=Na+\tfrac{1}{2}Np \, \mathrm{Sin}(2\,\pi t/P)$$

where P is the modulation period of the refractive index profile. A rugate filter will strongly reflect light at a wavelength of λ0=2 NaP. Thus, given notch cutons of 400 nm and 475 nm, the average refractive index (Na) and the peak-to-peak modulation of the refractive index (Np) for each of the respective Rugate filter 50 layers can easily be determined.

Figure 2:
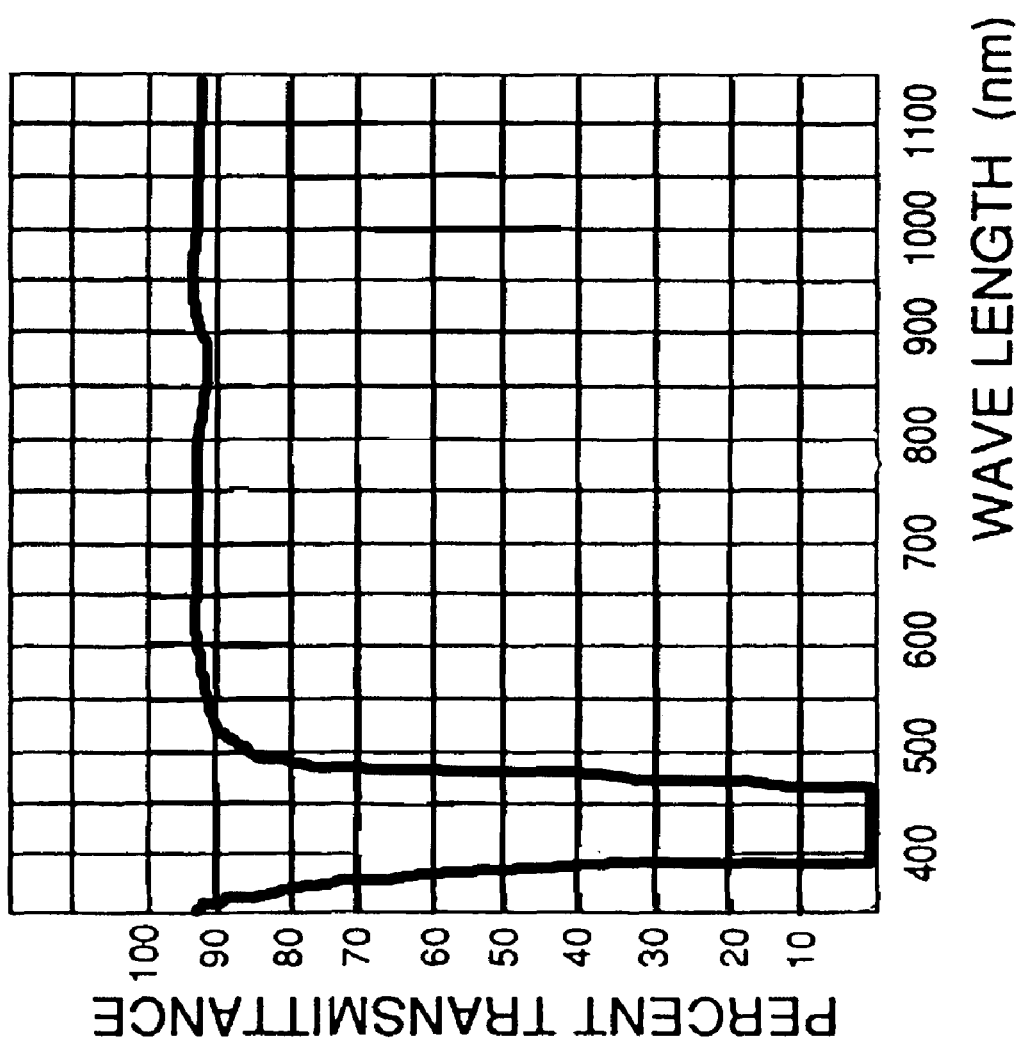
FIG. 2 is a graph of the spectral transmittance of the Rugate filter 50 measured from 290 nm to 1,400 nm.

The Rugate filter 50 according to the present invention results in bandstop characteristics as shown in FIG. 2, which is a graph of the spectral transmittance of the Rugate filter 50 measured from 290 nm to 1,400 nm. The entire visible blue light spectrum is eliminated between 400 nanometers (nm) and 475 nm. All other visible light is passed, inclusive of the UVB (290 nm to 320 nm) and UVA (321 nm to 399 nm) range, plus the IR spectrum including the near infrared range (from 700 nm to 1,400 nm). Thus, the Rugate filter 50 effectively forms a stop band between 400 nanometers (nm) and 475 nm, achieving at least 95%, or in some embodiments, 99% reduction of visible blue light. Consequently, the Rugate filter 50 as incorporated into the lens of the present invention to substantially preserve visual function over time.

To form Rugate filter 50 layers, a typical Rugate deposition process may be used in which a low index material and high index material are deposited, the rate of deposit of the low index material being held constant while the rate for the high index material is varied to achieve the correct refractive index modulation in the deposited film. A combination of Silicon, Oxygen and Nitrogen compounds may be used in specific ratios to provide a pre-defined variation in the index of refraction. For example, Silicon Dioxide ($SiO_2$) provides an index of refraction of about 1.5 while Silicon Nitride ($Si_3N_4$) provides a value of about 2.0. It should be noted that other combinations may be possible to achieve this desired light transmission profile. These materials are deposited by means of a plasma-enhanced chemical vapor deposition process (PECVD). See, for example, Goetzelmann et al., "Uv Coatings Produced with Plasma-ion-assisted Deposition", SPIE Vol. 3738, p. 48-57 (September 1999), which describes the plasma-ion-assisted deposition for the production of multi-layer coatings for the visible and NIR spectral range including rugate filters.

In the present case, Rugate filter 50 coatings can be deposited on the lens layer 16 using an increment deposition approach in which the variation in the index of refraction is calculated to provide a Rugate filter 50 which achieves the desired bandstop filter profile. The optical thickness (Ot) of the layer being deposited may be obtained by measuring the reflectance (R) of the thin film at wavelengths away from the reflection band of the filter. A computer and a monochrometer are used in a known manner to control the deposition and monitoring. Prior to beginning the deposition of thin film layers of filter 50, the predetermined refractive index profile at 780 nm is stored in the memory of the computer. As the deposition process proceeds, the computer receives signals from the monochrometer that correspond to the thin film reflectance spectrum. Using the reflectance spectrum detected by the monochrometer, the computer calculates a current optical thickness estimate. Next, the refractive index specified by the predetermined profile for that optical thickness of the film is calculated. The computer then provides a control signal to drive an energy source so that the mixture of evaporated materials produces the specified refractive index for the current optical thickness. This process is repeated continuously until the deposited layer corresponds to the specified refractive index profile. Deposition is terminated when the total predetermined optical thickness is achieved. This results in a single layer Rugate 50 film having a continuously varying index of refraction along a thickness direction with a number of maxima and minima in the index.

Preferably, the Rugate filter 50 used herein are color-neutral so as not to alter the light transmission profile of the other lens layers. See, for example, Johnson et al., "Color Neutral Rugate Filters", SPIE Vol. 2046, p. 132-140 (November 1993), which describes a transmissive rugate filter which is designed to reflect a portion of the visible spectrum and yet not appear to have a dominant color.

In the lens sandwich embodiment, high-contrast blue-blocking amber or grey CR-39 lens layers 16, 18 block UVA and UVB light, the polarizing filter layer 17 adds dramatic glare blocking properties, and the Rugate 50 adds visible blue light protection, all while maintaining an excellent light transmission profile.

For the optional polarizing filter layer 17, a conventional polarizing film filter is interposed between the two optical lens layers 16, 18 as either a laminated or a cast suspended filter. Laminated lenses are made by sandwiching the polarized film 17 between the two layers of plastic or polycarbonate or glass 16, 18, utilizing an adhesive to hold them together. However, adhesive can make the laminated lens appear hazy and the adhesion can fail when subjected to high heat and processing forces. CR-39 (plastic) or polycarbonate lens blanks may be cast with a suspended polarizing filter 17 and need not rely upon adhesives to hold everything together. In this case, molecular bonding is used to chemically join the lens layers 16-18, thus totally encapsulating the polarizing filter layer 17 between the two CR-39 plastic lens layers 16, 18 thereby avoiding haze and delamination.

The combination of the above-described Rugate filter 50, and optical lens layers 16, 18 sandwiching a polarizing lens layer 17, and color tints dramatically reduce glare and increase contrast in varying types of light conditions, and the sandwiched configuration is most durable for use in any environment. The light transmission properties of the improved multi-layer sunglass lens are optimized for maximum ocular safety. Ultraviolet absorption of 100% of UV-A & B light occurs to at least 400 nm, and at least 95%, or in some embodiments, 99% visible blue light reflection occurs between 400-475 nm, thereby preserving visual function, and visual acuity is preserved by a balance light transmission profile.

In addition to the basic sandwich configuration described above, an optional multi-layered dielectric mirror layer 14 may be applied exteriorly (over the Rugate filter layer 50 or, if Rugate layer 50 is placed interiorly, over outer optical lens layer 16). U.S. Pat. No. 5,844,225 to Kimock et al discloses an optical coating design formed in a multi-layer "dielectric stack" configuration for producing an anti-reflection feature, plus a method for fabricating a coated substrate product. Kimock et al. '225 also suggests various stacked layers inclusive of titanium oxide, nitride, zirconium nitride, boron nitride, yttrium oxide, silicon oxide, silicon dioxide, zirconium oxide, silicon carbide, aluminum oxide, aluminum nitride, and various mixtures thereof. The optional multi-layered dielectric mirror layer 14 may be applied using a similar method to create a stacked layer which actually comprises six equal-thickness thin film layers (2-3 nm total) of titanium oxide, silicon dioxide (quartz), zirconium oxide, and chromium, each thin film layer being vacuum deposited separately in alternating 90 degree angles to provide a reflective mirror finish. Dielectric mirrors in general combine high reflection values with outstanding durability characteristics. These coatings can generally exhibit significantly higher reflectance values than metallic films over specific wavelength intervals. The present stacked dielectric mirror layer 14 with particular constituents applied in alternating angular deposits further optimizes the lens to reduce light transmission through the entire UV and visible light spectrum, and may be used as desired to supplement the performance of the Rugate filter 50.

Finally, an optional hydrophobic overcoat 13 may be applied as an outermost layer 13 of the lens sandwich. The hydrophobic overcoat 13 is applied directly onto the dielectric layer 14 or Rugate filter layer 50 depending on the chosen sandwich configuration. The hydrophobic coating is preferably a silicon-based chemical coating of known type such as commercially available from OMS, 177108 Canada Inc., 5120 Courtrai, Suite 12, Montréal, Québec, Canada H3W 1A7. This coating 13 may be deposited by known dipping or chemical vapor deposition processes, and it makes the lens water repellant for better vision during rainstorms or water related activities. In addition, hydrophobic overcoat 13 makes the lens easier to clean as contaminants do not adhere to the lubricated lens surface easily. Moreover, the hydrophobic overcoat 13 resists smudging and streaking due to environmental and body contaminants. This hydrophobic layer 13 also produces a sealing effect to protect the lens and other base coatings, and to increases the longevity of the underlying layers. The hydrophobic coating 13 bonds with the lens to create a barrier against dirt, repelling dust, grease and liquid. The coating is non-acidic. It allows the lens to be cleaned with a wiping cloth without cleaning solution. The hydrophobic coating does not optically change the lens properties. It is extremely durable water repellant and not only repels water, but any other undesirable matter, including salt spray. The hydrophobic coating also combats bacterial build-up as dirt and oils do not stay on the lens.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. An optical lens comprising a filter that selectively blocks a selected range of visible blue light wavelengths within the range of 400 nm to 475 nm and transmits visible light at wavelengths both below and above the selected range, wherein the transmittance of visible light at wavelengths both below and above the selected range is higher than the transmittance of light at wavelengths within the selected range.

2. The optical lens according to claim 1, wherein the optical lens is a sunglass lens.

3. The optical lens according to claim 1, wherein said optical lens is made of any one from among the group consisting of glass, plastic, allyl diglycol carbonate, polycarbonate, a polyurethane, high-index plastic, and high-index glass.

4. The optical lens of claim 1, wherein the lens provides a balanced light transmission profile.

5. The optical lens of claim 4, further comprising a lens sandwich including a polarizing layer sandwiched between a first lens layer and a second lens layer, said filter being applied exteriorly to said lens sandwich.

6. The optical lens of claim 5, wherein said polarizing layer is encapsulated between the first and second optical lens layers.

7. The optical lens of claim 5, wherein said first lens layer and said second lens layer are any one from among the group consisting of glass, plastic, allyl diglycol carbonate, polycarbonate, a polyurethane, high-index plastic, and high-index glass.

8. The optical lens of claim 5, further comprising a dielectric mirror in advance of said filter and said lens sandwich for reducing glare and overall light transmission.

9. The optical lens of claim 7, wherein said first lens layer and said second lens layer are colorized with high-contrast blue-blocking amber-tint or color discriminating grey tint.

10. The optical lens of claim 8, wherein said dielectric mirror is a multi-layered dielectric mirror.

11. The optical lens of claim 5, further comprising a hydrophobic coating in advance of said filter and said lens sandwich.

12. The optical lens according to claim 1, wherein the optical lens is an ophthalmic lens.

13. The optical lens according to claim 4, wherein the selectively blocked visible blue light is at least 99% blocked.

14. The optical lens according to claim 13, wherein substantially 100% of UV-A and UV-B light is blocked.

15. The optical lens of claim 1, wherein the optical lens is a polarized sunglass lens.

16. The optical lens of claim 1, wherein the optical lens is color neutral.

17. The optical lens of claim 1, wherein the filter is a transparent coating.

18. The optical lens of claim 1, wherein the filter has an incrementally varying refractive index profile.

19. The optical lens of claim 1, wherein the filter has a continuously varying refractive index profile.

20. The optical lens of claim 1, wherein the filter comprises a bandstop filter.

21. The optical lens according to claim 20, wherein said bandstop filter comprises a rugate filter.

22. The optical lens according to claim 21, further comprising a lens sandwich including a polarizing layer sandwiched between a first lens layer and a second lens layer, said rugate filter being applied exteriorly to said lens sandwich.

23. The optical lens according to claim 22, further comprising a dielectric mirror in advance of said rugate filter and said lens sandwich for reducing glare and overall light transmission.

24. The optical lens according to claim 22, wherein at least one of said first lens layer and said second lens layer are colorized with high-contrast blue-blocking amber-tint or color discriminating grey tint.

25. The optical lens according to claim 24, wherein both of said first lens layer and said second lens layer are colorized with high-contrast blue-blocking amber-tint or color discriminating grey tint to substantially block 100% of UV-A and UV-B light below 400 nm.

26. The optical lens according to claim 23, wherein said dielectric mirror is a multi-layered dielectric mirror.

27. The optical lens according to claim 26, further comprising a hydrophobic coating in advance of said rugate filter and said lens sandwich.

28. The optical lens according to claim 22, wherein said polarizing layer is encapsulated between the first and second optical lens layers.

29. The optical lens of claim 1, wherein the filter transmits at least about 90% of light at wavelengths that are not selectively blocked.

30. The optical lens of claim 3, wherein said optical lens is made of any one from among the group consisting of glass, allyl diglycol carbonate, polycarbonate, a polyurethane, and high-index glass.

31. An optical lens comprising a bandstop filter that selectively blocks a selected range of visible blue light wavelengths within the range of 400 nm to 475 nm and transmits visible light at wavelengths both below and above the selected range, wherein the transmittance of visible light at wavelengths both below and above the selected range is higher than the transmittance of light at wavelengths within the selected range.

32. A sunglass lens, comprising:
a polarizing film layer sandwiched between first and second ophthalmic lens layers;
a rugate filter applied to one of said first and second ophthalmic lens layers, said rugate filter being formed as a transparent coating with an incrementally varying refractive index profile along its width;
whereby said polarizing layer, rugate filter, and first and second ophthalmic lens layers are arranged to provide a balanced light transmission profile in which substantially 100% of UV-A and UV-B light is blocked below 400 nm, and 99% of visible blue light is blocked between 400-475 nm.

33. The sunglass lens according to claim 32, further comprising a dielectric mirror for reducing glare and overall light transmission.

34. An optical lens comprising:
a first ophthalmic lens layer;
a second ophthalmic lens layer;
a polarizing layer sandwiched between said first and second ophthalmic lens layers; and
a rugate filter layer defining a pass band filter with bandstop cutoffs at approximately 400 nm and 475 nm, said rugate filter layer being applied exteriorly to one of said first and second ophthalmic lens layers;

whereby said layers combine to provide a balanced light transmission profile in which substantially 100% of UV-A and UV-B light below 400 nm is blocked, at least 95% of visible blue light is blocked between 400-475 nm.

35. The optical lens of claim 34, wherein said rugate filter layer is a multi-layered rugate filter.

36. The optical lens of claim 35, wherein said polarizing layer is encapsulated between the first and second ophthalmic lens layers.

37. A contact lens comprising a filter that selectively blocks a selected range of visible blue light wavelengths within the range of 400 nm to 475 nm and transmits visible light at wavelengths both below and above the selected range, wherein the transmittance of visible light at wavelengths both below and above the selected range is higher than the transmittance of light at wavelengths within the selected range.

38. The contact lens according to claim 37, further comprising means for blocking UV-A and UV-B light below 400 nm.

39. The contact lens according to claim 38, wherein said UV-A and UV-B light blocking means comprises a rugate filter.

40. An intraocular lens comprising a filter that selectively blocks a selected range of visible blue light wavelengths within the range of 400 nm to 475 nm and transmits visible light at wavelengths both below and above the selected range, wherein the transmittance of visible light at wavelengths both below and above the selected range is higher than the transmittance of light at wavelengths within the selected range.

41. The intraocular lens of claim 40, further comprising a means for blocking UV-A and UV-B light below 400 nm.

42. The intraocular lens according to claim 41, wherein said UV-A and UV-B light blocking means comprises a rugate filter.

43. An optical lens comprising opposing surfaces and a coating formed on at least one of said surfaces, said coating selectively blocks a selected range of visible blue light wavelengths within the range of 400 nm to 475 nm and transmits at least some visible light at wavelengths both below and above the selected range, wherein the transmittance of visible light at wavelengths both below and above the selected range is higher than the transmittance of light at wavelengths within the selected range.

44. The optical lens of claim 43, wherein the coating is a filter.

45. The optical lens of claim 44, wherein the filter comprises a bandstop filter.

46. The optical lens of claim 45, wherein the bandstop filter comprises a rugate filter.

47. A spectacle lens that selectively blocks a selected range of visible blue light wavelengths within the range of 400 nm to 475 nm and transmits at least some visible light at wavelengths both below and above the selected range, wherein the transmittance of visible light at wavelengths both below and above the selected range is higher than the transmittance of light at wavelengths within the selected range, and wherein said lens comprises both a tint and a coating designed to alter the spectrum of light.

48. The spectacle lens of claim 47, wherein said lens also inhibits UV-A and UV-B light.

49. An optical lens comprising a thin layer, wherein said thin layer selectively blocks a selected range of visible blue light wavelengths within the range of 400 nm to 475 nm and transmits at least some visible light at wavelengths both below and above the selected range, wherein the transmittance of visible light at wavelengths both below and above the selected range is higher than the transmittance of light at wavelengths within the selected range.

50. The optical lens of claim 49, wherein said thin layer blocks at least 95% of visible blue light between 400-475 nm.

51. An optical lens comprising a first layer that selectively blocks a selected range of visible blue light wavelengths within the range of 400 nm to 475 nm and transmits at least some visible light at wavelengths both below and above the selected range, wherein the transmittance of visible light at wavelengths both below and above the selected range is higher than the transmittance of light at wavelengths within the selected range, and a second layer that blocks UV-A and UV-B light of wavelengths below 400 nm.

* * * * *